United States Patent
Boss et al.

(10) Patent No.: US 8,327,170 B2
(45) Date of Patent: Dec. 4, 2012

(54) COMPUTING LOAD MANAGEMENT METHOD AND SYSTEM

(75) Inventors: Gregory Jensen Boss, Saginaw, MI (US); Rick Allen Hamilton, II, Charlottesville, VA (US); Julianne Frances Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/413,227

(22) Filed: Mar. 6, 2012

(65) Prior Publication Data
US 2012/0166834 A1     Jun. 28, 2012

Related U.S. Application Data

(63) Continuation of application No. 12/391,390, filed on Feb. 24, 2009, now Pat. No. 8,201,000.

(51) Int. Cl.
*G06F 1/26* (2006.01)

(52) U.S. Cl. ............ 713/320; 700/295; 307/34; 307/35; 307/39; 307/129

(58) Field of Classification Search .................. 713/320, 713/321, 322; 700/295–297; 307/34, 35, 307/39, 129
See application file for complete search history.

(56) References Cited

U.S. PATENT DOCUMENTS

| | | | | | |
|---|---|---|---|---|---|
| 2,839,692 | A | * | 6/1958 | Kirchmayer | 307/57 |
| 3,486,033 | A | * | 12/1969 | Salo | 307/39 |
| 3,558,911 | A | * | 1/1971 | Chen | 307/129 |
| 3,944,885 | A | * | 3/1976 | Sparling | 361/54 |
| 3,993,984 | A | * | 11/1976 | Penrod | 340/658 |
| 4,317,049 | A | * | 2/1982 | Schweppe | 307/39 |
| 4,319,329 | A | * | 3/1982 | Girgis et al. | 702/75 |
| 4,385,241 | A | * | 5/1983 | Peddie et al. | 307/39 |
| 5,426,620 | A | * | 6/1995 | Budney | 368/10 |

(Continued)

FOREIGN PATENT DOCUMENTS

CA     2082914     5/1994

(Continued)

OTHER PUBLICATIONS

Zin et al. Static and Dynamic Under-Frequency Load Shedding: A Comparison. IEEE. 2004.*

(Continued)

*Primary Examiner* — Matthew D Spittle
(74) *Attorney, Agent, or Firm* — Schmeiser, Olsen & Watts; Anna Linne (57) ABSTRACT

A load management method and system. The method includes detecting and monitoring by a computing system, a frequency signal associated with an input voltage signal used for powering computing apparatuses at a specified location. The computing system compares the frequency signal to a predetermined frequency value. The computing system determines that the frequency signal comprises a first value that is not equal to the predetermined frequency value. The computing system calculates a difference value between the first value and the predetermined frequency value. The computing system compares the difference value to a second value and analyzes a power demand profile. The computing system enables a load adjustment modification process associated with the plurality of power consumption devices based on the difference value and the power demand profile. The computing system generates and stores a report associated with the load adjustment modification process.

20 Claims, 3 Drawing Sheets

U.S. PATENT DOCUMENTS

| | | | |
|---|---|---|---|
| 5,442,335 A * | 8/1995 | Cantin et al. | 340/13.22 |
| 5,687,139 A * | 11/1997 | Budney | 368/10 |
| 6,314,378 B1 * | 11/2001 | Hodge et al. | 702/57 |
| 6,671,586 B2 * | 12/2003 | Davis et al. | 700/295 |
| 6,862,498 B2 * | 3/2005 | Davis et al. | 700/295 |
| 6,993,683 B2 * | 1/2006 | Bhat et al. | 714/43 |
| 7,010,363 B2 * | 3/2006 | Donnelly et al. | 700/19 |
| 7,149,605 B2 * | 12/2006 | Chassin et al. | 700/295 |
| 7,218,998 B1 * | 5/2007 | Neale | 700/295 |
| 7,242,114 B1 * | 7/2007 | Cannon et al. | 307/129 |
| 7,274,975 B2 | 9/2007 | Miller | |
| 7,355,301 B2 * | 4/2008 | Ockert et al. | 307/29 |
| 7,356,385 B2 * | 4/2008 | Lenarduzzi et al. | 700/295 |
| 7,356,422 B2 * | 4/2008 | Schweitzer, III | 702/60 |
| 7,420,293 B2 * | 9/2008 | Donnelly et al. | 307/34 |
| 7,595,567 B1 * | 9/2009 | Cannon et al. | 307/29 |
| 7,783,339 B2 * | 8/2010 | Lee et al. | 600/509 |
| 2008/0167756 A1 | 7/2008 | Golden et al. | |
| 2010/0218006 A1 | 8/2010 | Boss et al. | |
| 2010/0218027 A1 | 8/2010 | Boss et al. | |

FOREIGN PATENT DOCUMENTS

| | | |
|---|---|---|
| GB | 2436253 | 9/2007 |

OTHER PUBLICATIONS

Zin et al. A Review of Under-frequency Load Shedding Scheme on TNB System. IEEE. 2004.*

Delfino et al. Implementation and Comparison of Different Under Frequency Load-Shedding Schemes. IEEE. 2001.*

Rune Gustavsson; Agents with Power; Communications of the ACM, Mar. 1999, vol. 42, No. 3; pp. 41-47.

Takemiya et al.; Sustainable Adaptive Grid Supercomputing: Multiscale Simulation of Semiconductor Processing across the Pacific; SC2006 Nov. 2006, Tampa, Florida, USA; 2006 IEEE; 11 pages.

Peng Li; Power Grid Simulation Via Efficient Sampling-Based Sensitivity Analysis and Hierarchical Symbolic Relaxation; DAV 2005, Jun. 13-17, 2005, Anaheim, California, USA; Copyright 2005 ACM; pp. 664-669.

Hanchate et al.; A Game-Theoretic Framework for Multimetric Optimization of Interconnect Delay, Power, and Crosstalk Noise During Wire Sizing; ACM Transactions on Design Automation of Electronic Systems, vol. 11, No. 3, Jul. 2006; pp. 711-739.

Benini et al.; System-Level Power Optimization: Techniques and Tools; ACM Transactions on Design Automation of Electronic Systems, vol. 5, No. 2, Apr. 2000; pp. 115-192.

Terzija, Vladimir V.; Adaptive Underfrequency Load Shedding Based on the Magnitude of the Disturbance Estimation; IEEE Transactions on Power Systems, vol. 21, No. 3, Aug. 2006; pp. 1260-1266.

Stefanidou et al.; Control Strategies for Under-frequency Load Shedding, Interaction of Distributed Generation with Load Shedding, Decentralized Under-Frequency Load Shedding of Household Loads; EEH Power Systems Laboratory, Swiss Federal Institute of Technology (ETH) Zurich; Semester Thesis PSL0904; Sep. 3, 2009; 71 pages.

Shokooh et al.; Intelligent Load Shedding Need for a Fast and Optimal Solution; IEEE PCIC Europe 2005; 10 pages.

Dong et al.; Adaptive Under-Frequency Load Shedding; Tsinghua Science and Technology; ISSN 1007-0214, 14/18, vol. 13, No. 6, Dec. 2008; pp. 823-828.

Office Action (Mail Date Sep. 15, 2011) for U.S. Appl. No. 12/391,308, filed Feb. 24, 2009.

Amendment filed Dec. 8, 2011 in response to Office Action (Mail Date Sep. 15, 2011) for U.S. Appl. No. 12/391,308, filed Feb. 24, 2009.

Notice of Allowance (Mail Date Feb. 6, 2012) for U.S. Appl. No. 12/391,308, filed Feb. 24, 2009.

Office Action (Mail Date Sep. 14, 2011) for U.S. Appl. No. 12/391,390, filed Feb. 24, 2009.

Amendment filed Dec. 8, 2011 in response to Office Action (Mail Date Sep. 14, 2011) for U.S. Appl. No. 12/391,390, filed Feb. 24, 2009.

Notice of Allowance (Mail Date Feb. 3, 2012) for U.S. Appl. No. 12/391,390, filed Feb. 24, 2009.

U.S. Appl. No. 13/413,354, filed Mar. 6, 2012.

* cited by examiner

COMPUTING LOAD MANAGEMENT METHOD AND SYSTEM

This application is a continuation application claiming priority to Ser. No. 12/391,390, filed Feb. 24, 2009.

FIELD

The present invention relates to a method and associated system for monitoring a frequency signal and performing a software/hardware load modification process for computing apparatuses based on a value of the frequency signal.

BACKGROUND

Monitoring and modifying power systems associated with devices typically comprises an inaccurate process with little flexibility. Accordingly, there exists a need in the art to overcome at least some of the deficiencies and limitations described herein above.

SUMMARY

The present invention provides a modification method comprising: detecting, by a computing system, a frequency signal associated with an input voltage signal used for powering a plurality of computing apparatuses at a specified location, wherein the computing system comprises a memory device, and wherein the memory device comprises a power demand profile describing limitations associated with operating the each computing apparatus of the plurality of computing apparatuses; monitoring, by the computing system, the frequency signal; first comparing, by the computing system, the frequency signal to a predetermined frequency value; determining, by the computing system based on the first comparing, that the frequency signal comprises a first value that is not equal to the predetermined frequency value; calculating, by the computing system, a difference value between the first value and the predetermined frequency value; second comparing, by the computing system, the difference value to a second value; analyzing, by the computing system, the power demand profile; enabling, by the computing system based on the analyzing and results of the second comparing, a load adjustment modification process associated with the plurality of computing apparatuses at the specified location, wherein the enabling is executed after a specified time delayed period, wherein the results of the second comparing indicates that the first value exceeds the predetermined frequency value by more than the second value, and wherein the load adjustment modification process comprises: determining, by the computing system, a desired load increase value associated with reducing said first value by a specified amount; selecting, by said computing system based on said desired load increase value, suspended jobs to resume on a first enabled computing apparatus of said plurality of computing apparatuses, wherein said selecting is based on priority scheduling of said suspended jobs, deadline scheduling of said suspended jobs, and a job with a least remaining/projected time of said suspended jobs; computing, by the computing system based on the desired load increase value, a current system utilization for increasing a processor performance and an I/O utilization performance; increasing, by the computing system based on the desired load increase value and results of the computing and the selecting, a first current power usage of a first enabled computing apparatus of the plurality of computing apparatuses; and third comparing, by the computing system, a first current load value on the input voltage signal to the desired load increase value; generating, by the computing system a report associated with the load adjustment modification process; and storing, by the computing system in the memory device, the report.

The present invention provides a modification method comprising: detecting, by a computing system, a frequency signal associated with an input voltage signal used for powering a plurality of computing apparatuses at a specified location, wherein the computing system comprises a memory device, and wherein the memory device comprises a power demand profile describing limitations associated with operating the each computing apparatus of the plurality of computing apparatuses; monitoring, by the computing system, the frequency signal; first comparing, by the computing system, the frequency signal to a predetermined frequency value; determining, by the computing system based on the first comparing, that the frequency signal comprises a first value that is not equal to the predetermined frequency value; calculating, by the computing system, a difference value between the first value and the predetermined frequency value; second comparing, by the computing system, the difference value to a second value; analyzing, by the computing system, the power demand profile; enabling, by the computing system based on the analyzing and results of the second comparing, a load adjustment modification process associated with the plurality of computing apparatuses at the specified location, wherein the enabling is executed after a specified time delayed period, wherein the results of the second comparing indicates that the first value is less than the predetermined frequency value by more than said second value, and wherein said load adjustment modification process comprises: determining, by said computing system, a desired load decrease value associated with increasing said first value by a specified amount; selecting, by said computing system based on said desired load decrease value, running jobs to suspend on a first enabled computing apparatus of the plurality of computing apparatuses, wherein the selecting is based on priority scheduling of the running jobs, deadline scheduling of the running jobs, and a job with a most remaining/projected time of the suspended jobs; computing, by the computing system based on the desired load decrease value, a current system utilization for decreasing a processor performance and an I/O utilization performance; decreasing, by the computing system based on the desired load decrease value and results of the selecting and the computing, a first current power usage of first enabled computing apparatus of the plurality of computing apparatuses; and third comparing, by the computing system, a first current load value on the input voltage signal to the desired load decrease value; generating, by the computing system a report associated with the load adjustment modification process; and storing, by the computing system in the memory device, the report.

The present invention provides a computer program product, comprising a computer readable storage device storing a computer readable program code, the computer readable program code configured to a perform method upon being executed by a processor of a computing system, the method comprising: detecting, by the computing system, a frequency signal associated with an input voltage signal used for powering a plurality of computing apparatuses at a specified location, wherein the computing system comprises a memory device, and wherein the memory device comprises a power demand profile describing limitations associated with operating the each computing apparatus of the plurality of computing apparatuses; monitoring, by the computing system, the frequency signal; first comparing, by the computing system, the frequency signal to a predetermined frequency value;

determining, by the computing system based on the first comparing, that the frequency signal comprises a first value that is not equal to the predetermined frequency value; calculating, by the computing system, a difference value between the first value and the predetermined frequency value; second comparing, by the computing system, the difference value to a second value; analyzing, by the computing system, the power demand profile; enabling, by the computing system based on the analyzing and results of the second comparing, a load adjustment modification process associated with the plurality of computing apparatuses at the specified location, wherein the enabling is executed after a specified time delayed period, wherein the results of the second comparing indicates that the first value exceeds the predetermined frequency value by more than the second value, and wherein the load adjustment modification process comprises: determining, by the computing system, a desired load increase value associated with reducing the first value by a specified amount; selecting, by the computing system based on the desired load increase value, suspended jobs to resume on a first enabled computing apparatus of the plurality of computing apparatuses, wherein the selecting is based on priority scheduling of the suspended jobs, deadline scheduling of the suspended jobs, and a job with a least remaining/projected time of the suspended jobs; computing, by the computing system based on the desired load increase value, a current system utilization for increasing a processor performance and an I/O utilization performance; increasing, by the computing system based on the desired load increase value and results of the computing and the selecting, a first current power usage of a first enabled computing apparatus of the plurality of computing apparatuses; and third comparing, by the computing system, a first current load value on the input voltage signal to the desired load increase value; generating, by the computing system a report associated with the load adjustment modification process; and storing, by the computing system in the memory device, the report.

The present invention advantageously provides a simple method and associated system capable of monitoring and modifying power systems associated with devices.

DETAILED DESCRIPTION

Figure 1:
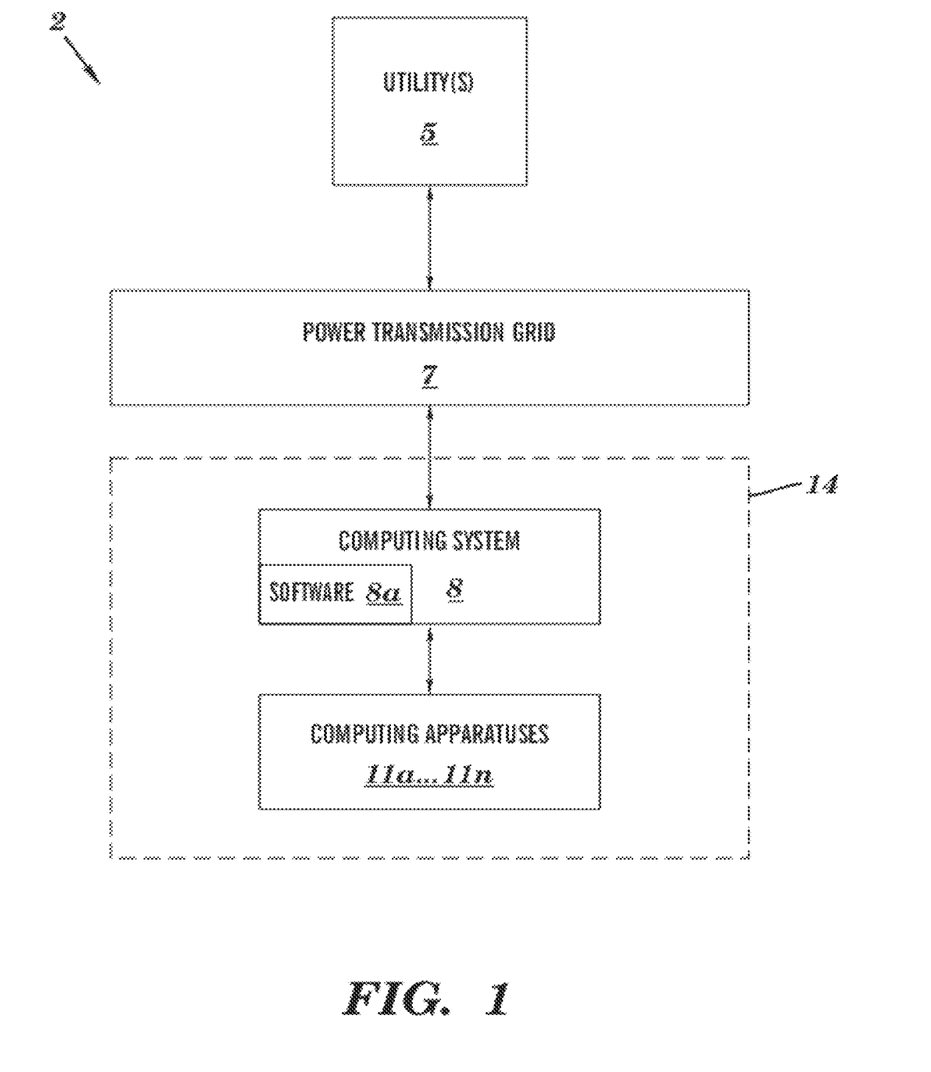
FIG. 1 illustrates a system for monitoring a frequency signal associated with a supply voltage retrieved from a power grid and performing a load adjustment modification process for a computing apparatus(s) based on a value of the frequency signal, in accordance with embodiments of the present invention.

FIG. 1 illustrates a system 2 for monitoring a frequency signal associated with a supply voltage retrieved from a power grid and performing a load adjustment modification process based on a value of the frequency signal, in accordance with embodiments of the present invention. Load fluctuations associated with power usage by computing resources in computing apparatuses 11a . . . 11n (e.g., software operations, hardware operations, etc) may cause the frequency signal (e.g., 60 Hertz (Hz)) associated with a supply voltage retrieved from a power grid (e.g., power transmission grid 7) to fluctuate (e.g., rise or fall). Therefore, system 2 is enabled to monitor the frequency signal and perform a load adjustment modification process (e.g., automatically increasing or decreasing software and/or hardware operations) based on a monitored value of the frequency signal.

System 2 comprises a computing system 8 connected to a utility(s) 5 through a power transmission grid 7. Computing system 8 is additionally connected to computing apparatuses 11a . . . 11n. Computing system 8 and computing apparatuses 11a . . . 11n are located within a specified location 14. Specified location may comprise a house and surrounding property, a building (associated with a business) and surrounding property, etc. Computing apparatuses 11a . . . 11n may comprise any type of computer that consumes electrical power (e.g., a personal computer, a notebook computer, a server, a personnel digital assistant, etc) provided by utility(s) 5. Electrical power may be retrieved via a power grid (e.g., power transmission grid 7). Utility 5 may comprise any type of electrical power supplier that produces and/or distributes electrical power. Utility(s) 5 may produce and/or distribute any type of electrical power including, inter alia, fossil fuel generated power, steam generated power, hydro generated power, solar generated power, wind generated power, fuel cell generated power, etc. Computing system 8 may comprise a memory system. The memory system may comprise a single memory system. Alternatively, the memory system may comprise a plurality of memory systems. The memory system may be internal to computing system 8 or external to computing system 8. Computing system 8 may comprise a software application 8a for controlling functionality. Computing system 8 comprises a system for monitoring a power grid (e.g., associated with power generated by utility(s) 5) frequency (e.g., 60 Hertz (Hz)) and adjusting a load associated with computing apparatuses 11a . . . 11n based on a value of the monitored frequency. Although system 2 is described with respect to monitoring a nominal frequency of 60 Hz (i.e., associated with power generated by utility(s) 5 and used in power generation in the United States), note that system 2 may be used to monitor any nominal frequency value. For example, system 2 may be used to monitor a nominal frequency value of 50 Hz (i.e., used in Europe, Africa, Asia, Australia, etc).

Computing system 8 comprises software application 8a interfacing with an existing power management module or computer hardware sub-components (for computing apparatuses 11a . . . 11n) including, inter alia, CPU, disk drives, memory, a display, CD/DVD optical drives, a universal serial bus (USB), a fire wire bus, wireless transmitters, etc. Within each of the hardware sub-components, computing system 8 modifies operating parameters in order to increase or decrease their power consumption. The operating parameters may comprise, inter alia:

1. CPU voltage and frequency.
2. Memory voltage and performance characteristics.
3. Front side bus voltage and frequency.
4. Disk activity including read ahead values and idle time power down.
5. Display brightness or screen saver timeout interval.
6. Optical drive rotational speed.

7. USB power consumption.
8. Wi-Fi and Bluetooth power settings.
9. Detection of external or internal battery backups.

Computing system 8 may scan for known battery backup solutions and adjust the sub-components operating parameters (i.e., of computing apparatuses 11a . . . 11n) accordingly. For example, a disk drive subsystem comprising a battery backup system may be modified to operate in a write-back state as opposed to a write-through state and momentarily suspend power to the actual disk drive. A write back state may then enable the computing system 8 to queue up read/write commands to an onboard memory cache so that write changes may be executed at a future time when the power to the disk drive system has been restored.

Each of computing apparatuses 11a . . . 11n comprises an associated power demand response profile associated with an operating system and individual software applications. Each power demand response profile may be stored within computing system 8 or within each associated computing apparatus (i.e., of computing apparatuses 11a . . . 11n). Each power demand response profile describes limitations associated with operating each computing apparatus. For example, an operating systems profile may restrict any power modifications to a disk sub-system or may prevent a CPU frequency from dropping below a specified threshold.

Software application 8a (e.g., a demand-side power frequency (DPF) response engine) comprised by computing system 8 is responsible for detecting frequency changes and making adjustments to the sub-components comprised by computing apparatuses 11a . . . 11n. Additionally, software application 8a evaluates computer and application profiles to determine thresholds within which to operate. Software application 8a detects low priority activities (e.g., a disk defragmentation operation) and if allowed by an application or computer profile, suspends the low priority activity in order to respond to a power frequency drop. Additionally, tasks which may not be required for an application to perform properly (e.g., a high rate of graphics refresh to reduce flicker and improve appearance) may be reduced by using a slower rate of refresh or a lower graphics resolution Likewise, if the power frequency increases above the target frequency, software application 8a may initiate a disk defragmentation operation and/or a virus scan which had been scheduled to begin at a later time. Either of these operations would significantly increase CPU, memory, and disk utilization thereby increasing power consumption.

Computing system 8 may log (i.e., generate a log file) a history of all power modifications. The log file may specify prior power consumption, new power consumption, a time, a date, and a delta power consumption. The log file time and date may be synchronized to widely available time standards (e.g., a network time protocol) so that the logs could be correlated with grid-wide events.

A computing or application profile may comprise a monetary valuation of an application or the entire computing apparatus itself. The monetary valuation may be used in conjunction with credits that the utility would provide for participation in the demand response system. The system would periodically send the log of changes to a database which the utility either owns or has access to. The utility would then credit the owners of computer systems according to how much power they reduced or increased as a result of changing power consumption to equalize to the target power frequency.

System 2 performs the following process:

When a frequency drop is detected and a load (i.e., associated with a power consumption of computing apparatuses 11a . . . 11n) must be decreased, sub-components of computing apparatuses (e.g., computing apparatuses 11a . . . 11n) may be turned off or down. Conversely, when a frequency increase is detected, sub-components of computing apparatuses (e.g., computing apparatuses 11a . . . 11n) may be turned on or up. System 2 enables a function by which the further the frequency deviates from a 60 Hz nominal value, the more and potentially faster system 2 responds. For example, if the frequency falls to 59.5 Hz, a sub-component offset for a computing apparatus is greater and a response of a controlled computing apparatus 11a . . . 11n is faster than if the frequency fell to only 59.8 Hz. System 2 does not require two-way communications between a power user and a power provider. In extreme cases (e.g., a loss of a large portion of power generating capacity), a power system frequency falls outside the 60.000+/−0.035 Hz dead-band used for most power generating systems. This results in further degradation of the power system as generators trip off-line due to their inability to function outside the dead-band. An amount of time for a response is measured in cycles (1/60th of a second) as a destructive interference between grid power and generator output may result in equipment damage. With communication delays measuring in seconds to minutes, this time may not be sufficient to avert a catastrophe. Therefore, system 2 enables a function by which the further the system frequency deviates from the 60.000 Hz nominal value the more and potentially faster system 2 responds.

The following steps illustrate a load adjustment modification process performed by system 2 based on a value of a monitored frequency signal on the power grid (e.g., from utility(s) 5):

1. If the monitored power grid frequency is plus or minus a dead-band value for the nominal line frequency (e.g., 60 Hz in North America and the Caribbean, 50 Hz in Europe, parts of Africa, Asia, and Australia, etc), normal settings for any modified computing apparatus are resumed.
2. If the monitored power grid frequency is greater than the nominal frequency by more the dead-band amount, a system load is increased by resuming any deferred computing jobs associated with sub-components or by starting additional scheduled computing jobs (i.e., as described in detail, infra).
3. If the monitored power grid frequency is less than the nominal frequency by more than the dead-band amount, a system load is decreased by suspending batch processing or by deferring scheduled computing jobs (i.e., as described in detail, infra).
4. System 2 delays for a specified time period and step 1 is repeated.

The following steps detail step 2 (i.e., resume computing jobs process) of the above described steps as follows:

A. Computing system 8 determines a desired increase in system load (and power consumption) based on a positive deviation (i.e., of the monitored power grid frequency) from a nominal grid frequency.
B. Computing system 8 selects suspended jobs to resume based on configurable scheduling algorithms. Algorithms may include: priority scheduling (e.g., highest priority jobs are started before lower priority jobs), deadline scheduling (e.g., a job must complete by a specified time), shortest job next (e.g., a job with least remaining/projected time next), round robin (jobs are selected for resumption in a circular fashion), etc.
C. Computing system 8 computes a current system utilization using such factors as, inter alia, CPU busy time, I/O utilization (disk and network bandwidth, etc.), memory bandwidth, etc. In order to increase CPU performance, an increase in a clock multiplier, frequency, and voltage may be performed. In order to increase I/O utilization, spin-down time delays (the period after which an idle disk drive enters a low power state) may be increased, predictive read-ahead may be increased, and a rotational speed of variable speed drives may be increased.

D. If a target load has been reached, the process terminates.

E. Computing system 8 selects jobs to start based on configurable scheduling algorithms. A job may be started prior to its normally scheduled time (i.e., by a configurable amount). For example, if database reorganization is normally scheduled for 4 AM, the job could be configured to start as early as 2 AM if an additional load is needed.

The following steps detail step 3 (i.e., resume computing jobs process) of the above described steps as follows:

A. Computing system 8 determines a desired decrease in system load based on a negative deviation (i.e., of the monitored power grid frequency) from a grid nominal frequency.

B. Computing system 8 select running jobs to suspend based on configurable scheduling algorithms. Computing system 8 continues to select running jobs to suspend until a target load is reached.

C. Computing system 8 computes a current system utilization using such factors as CPU busy time, I/O utilization (disk and network bandwidth, etc), etc. Any components which are currently under utilized are placed in a lower power state (e.g., reducing a CPU clock multiplier, suspending unused cores, lowering operating voltages, etc).

D. If a target load has been reached, the process terminates.

E. Computing system 8 selects pending jobs (jobs which are not yet started, but which are schedule to start shortly) for deferral.

The following steps describe a process for computing a target load:

A. If a deviation from the grid frequency is positive, computing system 8 determines a possible increase in system power consumption by determining current power consumption and a maximum power consumption. Computing system 8 determines an increase in system load (e.g., a number of executing jobs) by analyzing a relationship between system utilization (e.g., executing jobs on processors, disk and network I/O requests, memory utilization, etc) and a necessary increase in power consumption. The increase in system load may include a change in hardware configuration to support additional job throughput (e.g., by having devices increase power and responsiveness). A mathematical function may comprise a simple linear relationship, a complex function (e.g., a quadratic equation) in which larger deviations in grid frequency result in more rapid increases in system load.

B. If a deviation from the grid frequency is negative, computing system 8 determines a possible decrease in system power consumption by determining current power consumption and a minimum acceptable power consumption. Computing system 8 determines a relationship between system utilization and a needed decrease in power consumption. The relationship may include a change to reduce idle cycles for the reduced job throughput (e.g., by having devices decrease power and responsiveness, power down unused memory banks, disk drives, and CPU cores, shifting devices or subsystems which have available stand-by power onto their stand-by power, etc).

Figure 2:
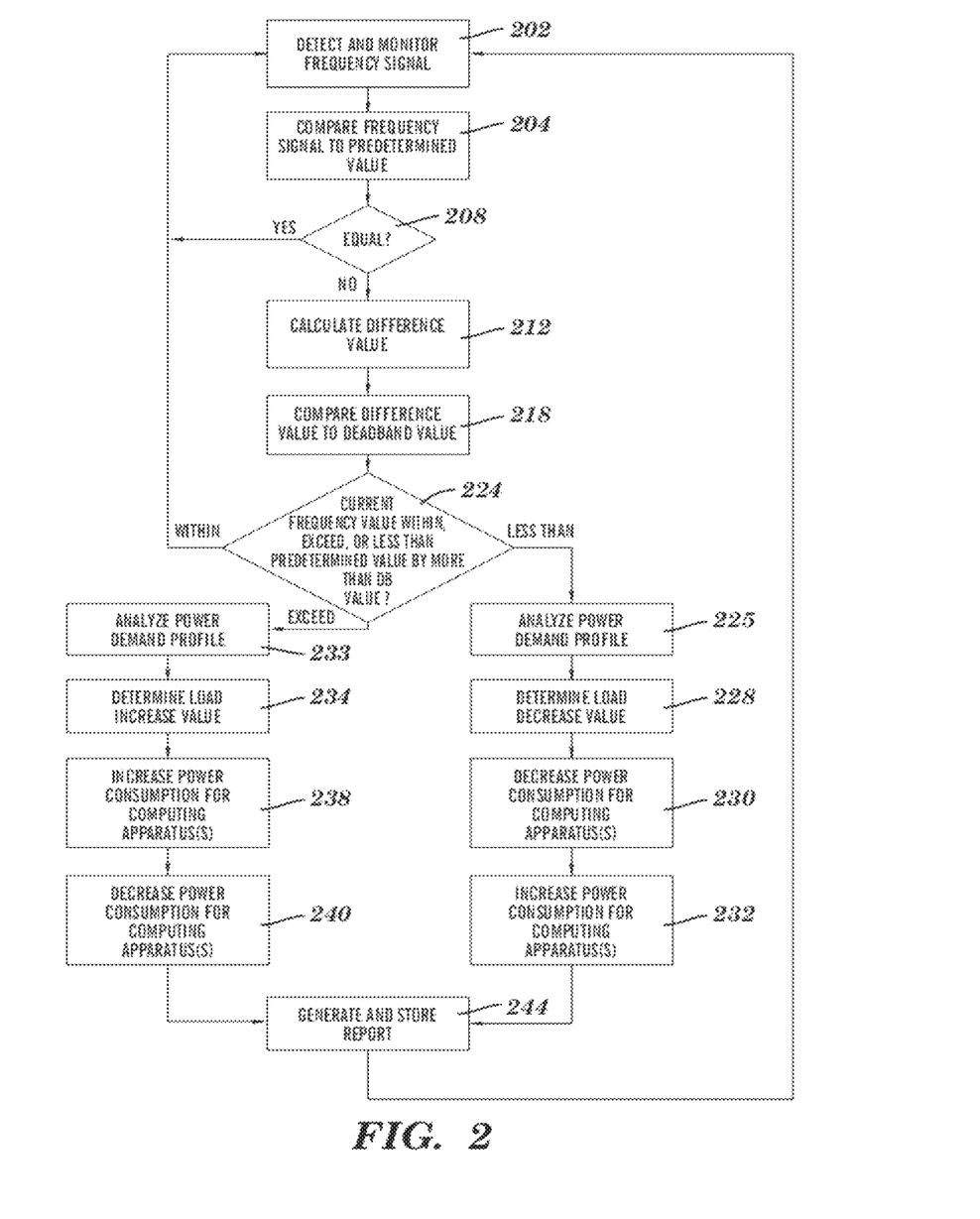
FIG. 2 illustrates a flowchart describing an algorithm used by the system of FIG. 1 for monitoring a frequency signal associated with a supply voltage retrieved from a power grid and performing a load adjustment modification process for a computing apparatus(s) based on a value of the frequency signal, in accordance with embodiments of the present invention.

FIG. 2 illustrates a flowchart describing an algorithm used by system 2 of FIG. 1 for monitoring a frequency signal associated with a supply voltage retrieved from a power grid (e.g., power transmission grid 7 in FIG. 1) and performing a load adjustment modification process based on a value of the frequency signal, in accordance with embodiments of the present invention. The load adjustment modification process is performed with respect to power consumption for computing apparatuses (e.g., computing apparatuses 11a ... 11n of FIG. 1). In step 202, a computing system (e.g., computing system 8 of FIG. 1) detects and monitors a frequency signal associated with an input voltage signal (i.e., from a utility (e.g., utility(s) 5 of FIG. 1) via a power grid) used for powering a computing apparatus (e.g., computing apparatuses 11a ... 11n of FIG. 1) at a specified location (e.g., specified location 14 of FIG. 1). In step 204, the computing system compares the frequency signal to a predetermined frequency value (i.e., the expected frequency value). For example, the predetermined frequency value may comprise, inter alia, 60 Hz, 50 Hz, etc. In step 208, the computing system determines (i.e., based on results generated in step 204) if the frequency signal comprises a current frequency value equal to the predetermined frequency value. If in step 208, it is determined that the frequency signal comprises a current frequency value equal to the predetermined frequency value then step 202 is repeated. If in step 208, it is determined that the frequency signal comprises a current frequency value that is not equal to the predetermined frequency value then in step 212, the computing system calculates a difference value between the current frequency value and the predetermined frequency value. In step 218, the computing system compares the difference value to a dead-band value. The dead-band value comprises an acceptable offset (i.e., for the current frequency value) from the predetermined frequency value. In step 224, (i.e., based on results from step 218), it is determined if the current frequency value is within the dead-band value range of the predetermined frequency or exceeds or is less than the predetermined frequency value by more than the dead-band value.

If in step 224, it is determined that the current frequency value is within the dead-band value range of the predetermined frequency then step 202 is repeated.

If in step 224, it is determined that the current frequency value exceeds the predetermined frequency value by more than the dead-band value then in step 233, a power demand profile is analyzed. The power demand profile describes limitations associated with operating each computing apparatus. In step 234, the computing system determines (i.e., based on limitations in the power demand profile) a desired load increase value associated with reducing the current frequency value by a specified amount. In step 238, the computing system increases (i.e., based on the desired load increase value, determined in step 234) a power usage of a computing apparatus(s) (e.g., by enabling additional hardware/software operations thereby reducing idle states) and a first current load value on the supply voltage signal is compared to the desired load increase value. If the first current load value exceeds the desired load increase value then in step 240, the computing system may decrease a power usage of the computing apparatus(s). When the desired load increase value is equal to the first current load value then a report indicating all changes is generated and stored by computing system in step 244 and the process is repeated (i.e., at step 202).

If in step 224, it is determined that the current frequency value is less than the predetermined frequency value by more than the dead-band value then in step 225, a power demand profile is analyzed. The power demand profile describes limitations associated with operating each computing apparatus. In step 228, the computing system determines (i.e., based on limitations in the power demand profile) a desired load decrease value associated with increasing the current frequency value by a specified amount. In step 230, the computing system decreases (i.e., based on the desired load decrease value, determined in step 228) a power usage of a computing apparatus(s) (e.g., by disabling enabled hardware/software operations thereby increasing idle states) and a first current load value on the supply voltage signal is compared to the desired load decrease value. If the first current load value is less than the desired load increase value then in step 232, the computing system may increase a power usage of the computing apparatus(s). When the desired load decrease value is equal to the first current load value then a report indicating all changes is generated and stored by computing system in step 244 and the process is repeated (i.e., at step 202).

Figure 3:
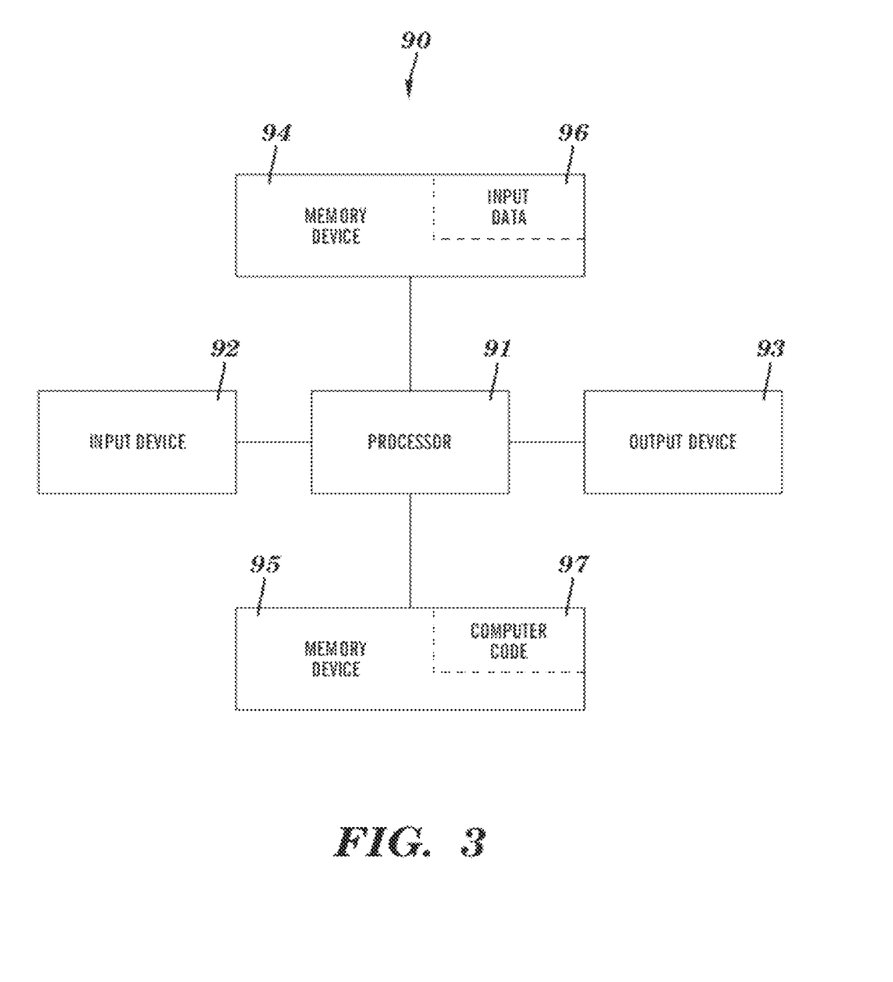
FIG. 3 illustrates a computer apparatus used for monitoring a frequency signal associated with a supply voltage retrieved from a power grid and performing a load adjustment modification process for a computing apparatus(s) based on a value of the frequency signal, in accordance with embodiments of the present invention.

FIG. 3 illustrates a computer apparatus 90 (e.g., computing system 8 of FIG. 1) used for monitoring a frequency signal associated with a supply voltage retrieved from a power grid and performing a load adjustment modification process based on a value of the frequency signal, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for monitoring a frequency signal associated with a supply voltage retrieved from a power grid and performing a load adjustment modification process based on a value of the frequency signal. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithms of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service supplier who offers to for monitor a frequency signal associated with a supply voltage retrieved from a power grid and perform a load adjustment modification process based on a value of the frequency signal. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for monitoring a frequency signal associated with a supply voltage retrieved from a power grid and performing a load adjustment modification process based on a value of the frequency signal. In another embodiment, the invention provides a business method that performs the process steps of the invention on a subscription, advertising, and/or fee basis. That is, a service supplier, such as a Solution Integrator, could offer to monitor a frequency signal associated with a supply voltage retrieved from a power grid and perform a load adjustment modification process based on a value of the frequency signal. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties. Additionally, the service supplier may manage (i.e., receive, collect, etc) financial services provided by an electric utility for providing or receiving power from/to system 2 of FIG. 1.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A modification method comprising:
    detecting, by a computing system, a frequency signal associated with an input voltage signal used for powering a plurality of computing apparatuses at a specified location, wherein said computing system comprises a memory device, and wherein said memory device comprises a power demand profile describing limitations associated with operating said each computing apparatus of said plurality of computing apparatuses;
    monitoring, by said computing system, said frequency signal;
    first comparing, by said computing system, said frequency signal to a predetermined frequency value;
    determining, by said computing system based on said first comparing, that said frequency signal comprises a first value that is not equal to said predetermined frequency value;
    calculating, by said computing system, a difference value between said first value and said predetermined frequency value;
    second comparing, by said computing system, said difference value to a second value;
    analyzing, by said computing system, said power demand profile;
    enabling, by said computing system based on said analyzing and results of said second comparing, a load adjustment modification process associated with said plurality of computing apparatuses at said specified location, wherein said enabling is executed after a specified time delayed period, wherein said results of said second comparing indicates that said first value exceeds said predetermined frequency value by more than said second value, and wherein said load adjustment modification process comprises:
        determining, by said computing system, a desired load increase value associated with reducing said first value by a specified amount;

selecting, by said computing system based on said desired load increase value, suspended jobs to resume on a first enabled computing apparatus of said plurality of computing apparatuses, wherein said selecting is based on priority scheduling of said suspended jobs, deadline scheduling of said suspended jobs, and a job with a least remaining/projected time of said suspended jobs;

computing, by said computing system based on said desired load increase value, a current system utilization for increasing a processor performance and an I/O utilization performance;

increasing, by said computing system based on said desired load increase value and results of said computing and said selecting, a first current power usage of a first enabled computing apparatus of said plurality of computing apparatuses; and third comparing, by said computing system, a first current load value on said input voltage signal to said desired load increase value;

generating, by said computing system a report associated with said load adjustment modification process; and storing, by said computing system in said memory device, said report.

2. The method of claim 1, wherein said increasing said first current power usage of said first enabled computing apparatus comprises enabling at least one additional hardware device/operation in said first enabled computing apparatus.

3. The method of claim 1, wherein said increasing said first current power usage of said first enabled computing apparatus comprises enabling at least one additional software operation in said first enabled computing apparatus.

4. The method of claim 1, wherein said increasing said first current power usage of said first enabled computing apparatus comprises enabling a software operation in said first enabled computing apparatus, wherein said software operation is scheduled to be executed during a future time period as compared to a current time period.

5. The method of claim 1, wherein said load adjustment modification process further comprises:
determining, by said computing system based on results of said third comparing, that said first current load value is less than said desired load increase value; and
increasing, by said computing system, a second current power usage of said first enabled computing apparatus.

6. The method of claim 5, wherein said load adjustment modification process further comprises:
fourth comparing, by said computing system, a second current load value on said input voltage signal to said desired load increase value;
determining, by said computing system based on results of said fourth comparing, that said second current load value is greater than said desired load increase value; and
decreasing, by said computing system, said second current power usage of said first enabled computing apparatus.

7. The method of claim 1, wherein said load adjustment modification process further comprises:
determining, by said computing system based on results of said third comparing, that said first current load value is less than said desired load increase value; and
increasing, by said computing system, a second current power usage of a second enabled computing apparatus of said plurality of computing apparatuses.

8. The method of claim 1, wherein said computing is based on factors selected from the group consisting of said processor busy time, a disk and network bandwidth and a memory bandwidth.

9. The method of claim 1, wherein said increasing said processor performance comprises increasing a clock multiplier, increasing a frequency, and increasing a voltage.

10. The method of claim 1, wherein said increasing said I/O utilization comprises increasing spin-down time delays and increasing a rotational speed of variable speed drives.

11. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

12. A modification method comprising:
detecting, by a computing system, a frequency signal associated with an input voltage signal used for powering a plurality of computing apparatuses at a specified location, wherein said computing system comprises a memory device, and wherein said memory device comprises a power demand profile describing limitations associated with operating said each computing apparatus of said plurality of computing apparatuses;

monitoring, by said computing system, said frequency signal;

first comparing, by said computing system, said frequency signal to a predetermined frequency value;

determining, by said computing system based on said first comparing, that said frequency signal comprises a first value that is not equal to said predetermined frequency value;

calculating, by said computing system, a difference value between said first value and said predetermined frequency value;

second comparing, by said computing system, said difference value to a second value;

analyzing, by said computing system, said power demand profile;

enabling, by said computing system based on said analyzing and results of said second comparing, a load adjustment modification process associated with said plurality of computing apparatuses at said specified location, wherein said enabling is executed after a specified time delayed period, wherein said results of said second comparing indicates that said first value is less than said predetermined frequency value by more than said second value, and wherein said load adjustment modification process comprises:
determining, by said computing system, a desired load decrease value associated with increasing said first value by a specified amount;
selecting, by said computing system based on said desired load decrease value, running jobs to suspend on a first enabled computing apparatus of said plurality of computing apparatuses, wherein said selecting is based on priority scheduling of said running jobs, deadline scheduling of said running jobs, and a job with a most remaining/projected time of said suspended jobs;
computing, by said computing system based on said desired load decrease value, a current system utilization for decreasing a processor performance and an I/O utilization performance;
decreasing, by said computing system based on said desired load decrease value and results of said selecting and said computing, a first current power usage of first enabled computing apparatus of said plurality of computing apparatuses; and third comparing, by said computing system, a first current load value on said input voltage signal to said desired load decrease value;

generating, by said computing system a report associated with said load adjustment modification process; and storing, by said computing system in said memory device, said report.

13. The method of claim 12, wherein said decreasing said first current power usage of said first enabled computing apparatus comprises disabling at least one hardware device/operation in said first enabled computing apparatus.

14. The method of claim 12, wherein said decreasing said first current power usage of said first enabled computing apparatus comprises disabling at least one additional software operation in said first enabled computing apparatus.

15. The method of claim 12, wherein said decreasing said first current power usage of said first enabled computing apparatus comprises disabling a software operation in said first enabled computing apparatus, wherein said software operation is scheduled to be executed during a future time period as compared to a current time period.

16. The method of claim 12, wherein said computing is based on factors selected from the group consisting of said processor busy time, a disk and network bandwidth and a memory bandwidth.

17. The method of claim 12, wherein said decreasing said processor performance comprises decreasing a clock multiplier, increasing a frequency, and increasing a voltage.

18. The method of claim 12, wherein said decreasing said I/O utilization comprises decreasing spin-down time delays and decreasing a rotational speed of variable speed drives.

19. A process for supporting computer infrastructure, said process comprising providing at least one support service for at least one of creating, integrating, hosting, maintaining, and deploying computer-readable code in a computing system, wherein the code in combination with the computing system is capable of performing the method of claim 12.

20. A computer program product, comprising a computer readable storage device storing a computer readable program code, said computer readable program code configured to a perform method upon being executed by a processor of a computing system, said method comprising:

detecting, by said computing system, a frequency signal associated with an input voltage signal used for powering a plurality of computing apparatuses at a specified location, wherein said computing system comprises a memory device, and wherein said memory device comprises a power demand profile describing limitations associated with operating said each computing apparatus of said plurality of computing apparatuses;

monitoring, by said computing system, said frequency signal;

first comparing, by said computing system, said frequency signal to a predetermined frequency value;

determining, by said computing system based on said first comparing, that said frequency signal comprises a first value that is not equal to said predetermined frequency value;

calculating, by said computing system, a difference value between said first value and said predetermined frequency value;

second comparing, by said computing system, said difference value to a second value;

analyzing, by said computing system, said power demand profile;

enabling, by said computing system based on said analyzing and results of said second comparing, a load adjustment modification process associated with said plurality of computing apparatuses at said specified location, wherein said enabling is executed after a specified time delayed period, wherein said results of said second comparing indicates that said first value exceeds said predetermined frequency value by more than said second value, and wherein said load adjustment modification process comprises:

determining, by said computing system, a desired load increase value associated with reducing said first value by a specified amount;

selecting, by said computing system based on said desired load increase value, suspended jobs to resume on a first enabled computing apparatus of said plurality of computing apparatuses, wherein said selecting is based on priority scheduling of said suspended jobs, deadline scheduling of said suspended jobs, and a job with a least remaining/projected time of said suspended jobs;

computing, by said computing system based on said desired load increase value, a current system utilization for increasing a processor performance and an I/O utilization performance;

increasing, by said computing system based on said desired load increase value and results of said computing and said selecting, a first current power usage of a first enabled computing apparatus of said plurality of computing apparatuses; and third comparing, by said computing system, a first current load value on said input voltage signal to said desired load increase value;

generating, by said computing system a report associated with said load adjustment modification process; and storing, by said computing system in said memory device, said report.

* * * * *